United States Patent
Nelson et al.

(10) Patent No.: US 12,088,854 B2
(45) Date of Patent: Sep. 10, 2024

(54) FRAME OVERLAY FOR ENCODING ARTIFACTS

(71) Applicant: GOOGLE LLC, Mountain View, CA (US)

(72) Inventors: Erik F. Nelson, Sunnyvale, CA (US); Douglas Sim Dietrich, Jr., Los Gatos, CA (US)

(73) Assignee: GOOGLE LLC, Mountain View, CA (US)

(*) Notice: Subject to any disclaimer, the term of this patent is extended or adjusted under 35 U.S.C. 154(b) by 416 days.

(21) Appl. No.: 17/435,883

(22) PCT Filed: Mar. 17, 2020

(86) PCT No.: PCT/US2020/023155
§ 371 (c)(1),
(2) Date: Sep. 2, 2021

(87) PCT Pub. No.: WO2020/190945
PCT Pub. Date: Sep. 24, 2020

(65) Prior Publication Data
US 2022/0182682 A1    Jun. 9, 2022

Related U.S. Application Data

(60) Provisional application No. 62/819,867, filed on Mar. 18, 2019, provisional application No. 62/947,952, filed on Dec. 13, 2019.

(51) Int. Cl.
*H04N 19/86* (2014.01)
*A63F 13/53* (2014.01)
(Continued)

(52) U.S. Cl.
CPC .............. *H04N 19/86* (2014.11); *A63F 13/53* (2014.09); *H04N 19/172* (2014.11); *H04N 19/89* (2014.11)

(58) Field of Classification Search
None
See application file for complete search history.

(56) References Cited

U.S. PATENT DOCUMENTS 9,153,012 B2    10/2015    Bredno et al.
10,250,872 B2    4/2019    Karimi-Cherkandi et al.
(Continued)

FOREIGN PATENT DOCUMENTS

JP    2008287329 A    11/2008
JP    2016136762 A    7/2016
(Continued)

OTHER PUBLICATIONS

International Preliminary Report on Patentability mailed Sep. 30, 2021 for PCT/US2020/023155, 10 pages.
(Continued)

*Primary Examiner* — Kaveh Abrishamkar (57) ABSTRACT

A game streaming system encodes a raw frame to generate an encoded frame for a game stream including a plurality of frames for display. The system identifies a first encoding artifact based on a first difference between the encoded frame and the raw frame, and applies an overlay to the encoded frame. The overlay includes a first visual indicator indicating the first encoding artifact.

32 Claims, 4 Drawing Sheets

(51) Int. Cl.
*H04N 19/172* (2014.01)
*H04N 19/89* (2014.01)

(56) References Cited

U.S. PATENT DOCUMENTS

| | | | |
|---|---|---|---|
| 2005/0062869 A1* | 3/2005 | Zimmermann | G06T 17/20 |
| | | | 348/E7.071 |
| 2010/0260271 A1 | 10/2010 | Kapoor | |
| 2012/0081385 A1* | 4/2012 | Cote | H04N 23/611 |
| | | | 345/589 |
| 2013/0190600 A1 | 7/2013 | Gupta et al. | |
| 2013/0202036 A1* | 8/2013 | Nagori | H04N 19/176 |
| | | | 375/240.13 |
| 2014/0002670 A1* | 1/2014 | Kolarov | H04N 17/004 |
| | | | 348/180 |
| 2014/0185678 A1* | 7/2014 | Liao | H04N 17/004 |
| | | | 375/240.27 |
| 2014/0321558 A1 | 10/2014 | Gu et al. | |
| 2016/0148351 A1 | 5/2016 | Hilbert et al. | |
| 2017/0312626 A1 | 11/2017 | Colenbrander | |

FOREIGN PATENT DOCUMENTS

| | | |
|---|---|---|
| JP | 2016225757 A | 12/2016 |
| JP | 2018050256 A | 3/2018 |
| WO | 2012/142285 A2 | 10/2012 |
| WO | 2013/078582 A1 | 6/2013 |

OTHER PUBLICATIONS

Translation of Japanese Office Action mailed Jan. 10, 2023 for Japanese Application No. 2021-556575, 7 pages.
European Office Action mailed Jul. 6, 2023 for European Application No. 20718956.4, 8 pages.
Lee, Sangwoo et al., "A new image quality assessment method to detect and measure strength of blocking artifacts", Signal Processing: Image Communication, Elsevier Science Publishers, Aug. 1, 2011, pp. 31-38.
Averbuch, Amir et al., "Deblocking of Block-Transform Compressed Images Using Weighted Sums of Symmetrically Aligned Pixels", IEEE Transactions on Image Processing, IEEE, USA, vol. 14, No. 2, Feb. 1, 2005, pp. 200-212.
International Search Report and Written Opinion mailed Jun. 2, 2020 for corresponding International Application No. PCT/US2020/023155, 14 pages.
Translation of Japanese Office Action mailed Jul. 25, 2023 for JP Application No. 2021-556575, 8 pages.
Translation of Chinese Office Action mailed Dec. 6, 2023 for CN Application No. 202080021766.1, 25 pages.

* cited by examiner

FRAME OVERLAY FOR ENCODING ARTIFACTS

CROSS-REFERENCE TO RELATED APPLICATIONS

The present application is a U.S. National Stage under 35 U.S.C. § 371 of International Patent Application Serial No. PCT/US2020/023155, entitled "FRAME OVERLAY FOR ENCODING ARTIFACTS" and filed on 17 Mar. 2020, which claims priority to U.S. Provisional Application No. 62/819,867, entitled "HEATMAP OF VIDEO ARTIFACTS" and filed on 18 Mar. 2019, and U.S. Provisional Application No. 62/947,952 entitled "HEATMAP OF VIDEO ARTIFACTS" and filed on 13 Dec. 2019, the entireties of which are incorporated by reference herein.

BACKGROUND

Video streaming systems stream video frames from a server to a client device over a network, leveraging the large storage space and compute power of the server to provide video content. For example, a game streaming system streams video frames representing a game environment while allowing the user to interact with the game environment via a game controller or other input device. To ensure rapid and efficient transmission of the video frames, the game streaming system can transmit the frames in an encoded format by encoding the frames at the server prior to transmission. However, encoding a frame can introduce encoding artifacts, such as color changes, feature blurring, and the like. Some game streaming systems address these issues by adjusting parameters for the encoding process, such as by encoding portions of a frame with less compression than other portions of the frame. However, the effectiveness of these ameliorative techniques often depends on identifying the particular features of the streamed frames that are most impacted by encoding, and identifying these features is difficult using conventional techniques.

SUMMARY

The proposed solution in particular relates to a method comprising encoding a raw frame to generate an encoded frame for a game stream comprising a plurality of frames for display; identifying a first encoding artifact based on a first difference between the encoded frame and the raw frame; and applying an overlay to the encoded frame, the overlay including a first visual indicator indicating the first encoding artifact.

In an exemplary embodiment, the first difference may comprise a difference in at least one characteristic of one or more pixels between the encoded frame and the raw frame, such as a color difference, a texture difference and/or a blur difference between the encoded frame and the raw frame. In this context, identifying the first difference may comprises identifying a difference in pixel variance for at least a portion of the encoded frame and a corresponding portion of the raw frame.

In an exemplary embodiment, including the first visual indicator with the overlay may be in response to the first difference exceeding a threshold. A corresponding threshold may, for example, relate to a pixel difference value, i.e., that the first visual indicator is included with the overlay when a pixel value difference between a pixel of the encoded frame and the raw frame exceeds a predetermined threshold.

The first visual indicator may, for example, be based on a magnitude and/or type of the first difference. In one exemplary embodiment, the method may comprise determining the type of the first difference out of at least two different types of differences for the first encoding artifact. Depending on the determined type the visual indicator may thus be different in order to allow for a visual indication of the type of encoding artefact by the overlay. For example, the method may comprise identifying a second encoding artifact based on a second difference between the encoded frame and the raw frame, wherein the overlay includes a second visual indicator indicating the second encoding artifact, the second visual indicator different from the first visual indicator. The first and second visual indicators may, for example differ in at least one of a size, a shape and color. A difference of the first and second visual indicators may then indicate a difference of the first and second encoding artifacts in type, magnitude or a combination thereof].

In an exemplary embodiment, the first visual indicator may be positioned at or over at least a part of or the complete first encoding artifact. Accordingly, when the overlay and the encoded frame are displayed together, the first visual indicator visibly highlights the corresponding encoding artifact.

Generally, the first visual indicator may for example comprises a color and/or a texture. For example, all pixels within a specified pixel radius of a pixel corresponding to the artifact may be inverted.

In an exemplary embodiment, an overlay generator of a server providing the game stream may be used, wherein the overlay generator is configured to generate the overlay for providing the first visual indicator.

Based on the first visual indicator at least one encoding parameter for encoding the raw frame may be adjusted. This may imply that at least two different, adjustable encoding parameters are used for encoding the raw frame and one or more of the encoding parameters are adjusted, automatically or by a user, based on the first visual indicator.

The proposed solution also relates to a method comprising identifying an encoding artifact based on a difference between a pixel of an encoded frame and a corresponding pixel of a raw frame, the encoded frame for provision via a game stream; applying an overlay to the encoded frame, the overlay indicating the encoding artifact; and displaying the encoded frame with the overlay.

In addition, the proposed solution also relates to a non-transitory computer readable medium embodying a set of executable instructions. The set of executable instructions is provided to manipulate at least one processor to encode a raw frame to generate an encoded frame for a game stream comprising a plurality of frames for display; identify a first encoding artifact based on a first difference between the encoded frame and the raw frame; and apply an overlay to the encoded frame, the overlay including a first visual indicator indicating the first encoding artifact. In particular a proposed medium may embody a set of executable instructions to manipulate at least one processor to implementing a proposed method.

Another aspect of the proposed solution relates to a real-time video streaming system comprising a server for generating encoded frames for transmission to at least one client device based on a game state of a video game program executed at the server. The server may be configured to: encode a raw frame to generate an encoded frame for a game stream of the video game program, the game stream comprising a plurality of frames for display; identify a first encoding artifact based on a first difference between the encoded frame and the raw frame; and apply an overlay to the encoded frame, the overlay including a first visual indicator indicating the first encoding artifact. In particular, a proposed real-time video streaming system may comprise a server which is configured to implement a proposed method.

The present disclosure in particular relates to techniques for generating an overlay that identifies encoding artifacts in an encoded frame to be streamed by a real-time video streaming system, such as a game streaming system. A server of the game streaming system generates each frame based on, for example, a game state of a video game program executed at the server. The server generates the frames in a "raw", or unencoded, format, the encodes the frames for transmission to a client device via a network. For at least one encoded frame, the server identifies an encoding artifact by identifying a difference between the encoded frame and the corresponding raw frame, such as, for example, a difference in color, texture, blur, or other characteristic of one or more pixels of the encoded and raw frames. The server generates an overlay with a visual indicator to highlight the identified encoding artifact and displays the overlay with the encoded frame. A user (e.g., a developer or a user of the client device) is thus able to quickly and easily identify encoding artifacts and can therefore quickly and easily adjust aspects of the game streaming system that address such artifacts, thereby improving performance of the game streaming system.

To illustrate, in some embodiments the encoder employs one or more parameters to govern the encoding process, such as quantization parameters, compression parameters, and the like. Adjustment of one or more of these parameters can reduce encoding artifacts. The effectiveness of these adjustments in reducing the encoding artifacts can be enhanced by identifying the particular encoding artifacts of one or more of the encoded frames to be streamed. For example, an encoder can implement variance-based adaptive quantization (VBAQ), and a developer can adjust the VBAQ parameters based on the particular encoding artifacts identified in one or more encoded frames to be streamed. However, because the streamed frames often have a large number of features, and the encoding artifacts of the frame can be small relative to the overall size of the streamed frames, it can be difficult to visually identify the encoding artifacts. By employing an overlay to visually highlight the encoding artifacts, the game streaming system allows a developer or other user of the system to quickly identify the artifacts and to make corresponding adjustments to the encoding parameters, thereby improving development and performance of the game streaming system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
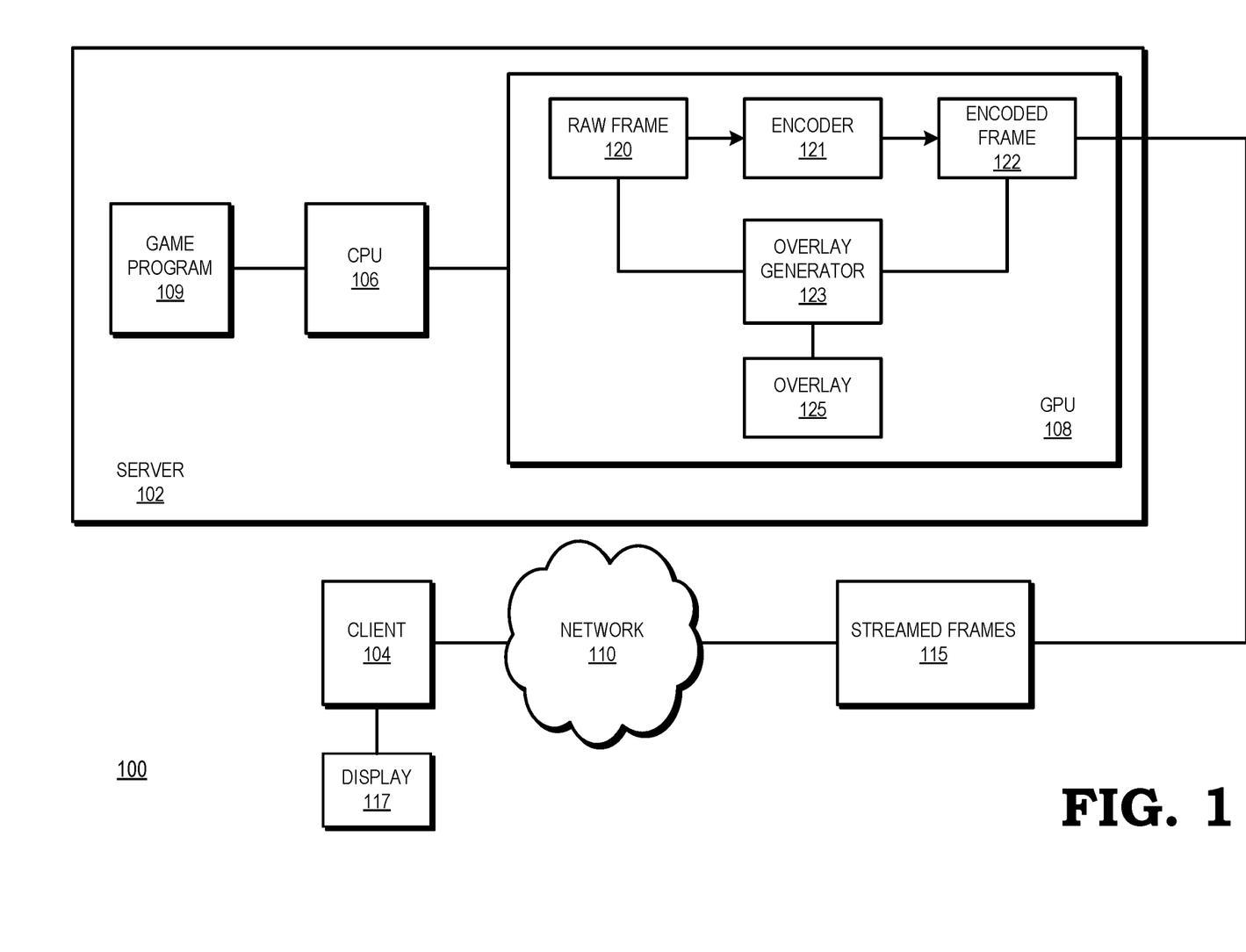
FIG. 1 is a block diagram of a game streaming system that generates a frame overlay that identifies encoding artifacts in an encoded frame of a game stream in accordance with some embodiments.

FIG. 1 illustrates a game streaming system 100 that is generally configured to stream rendered game content from a server 102 to a client device 104. In the depicted example, the server 102 and the client device 104 communicate via a network 110, wherein the network 110 is a packet-switched or other network that is generally configured to transfer data, including video data, via one or more routers, servers, communication towers (e.g. cellular communication towers), and the like, or any combination thereof. Accordingly, in various embodiments, the network 110 is a wide-area network (e.g., the Internet), a local-area network, and the like, or any combination thereof.

The server 102 and the client 104 are generally configured to collectively implement a streamed game session wherein interactive game content is streamed from the server 102 to the client device 104. Accordingly, the server 102 can be any type of computer device that implements the functionality described further herein, such as a rack-mounted server, a cluster server (i.e. a server device implemented in a cluster of server devices), a mobile server device, and the like, or a combination thereof. The client device 104 can be any computer device that can display video frames to a user and can receive user input, and therefore can be a desktop or laptop computer, a digital media player, a game console, a smartphone, a tablet, and the like.

To support streaming of game content to the client device during a streamed game session, the server 102 includes a plurality of processing units, such as a central processing unit (CPU) 106 and a graphics processing unit (GPU) 108. The CPU 106 is a processing unit generally configured to execute general purpose sets of instructions, organized in the form of computer programs, to carry out tasks on behalf of the server 102. Examples of such computer programs include operating systems, virtual machines, data security programs (e.g. data encryption/decryption programs), web pages, database programs, and the like.

The GPU 108 is a processing unit generally configured to execute operations associated with graphics and vector processing based on commands received from the CPU 106. For example, in the course of executing one or more general purpose programs, the CPU 106 generates commands to generate and manipulate graphical models for display and provides the commands to the GPU 108. In response, the GPU 108 executes the commands by executing one or more corresponding graphical operations, thereby manipulating the graphical models to generate one or more frames for display. In some embodiments, the frames generated by the GPU 108 are rendered frames ready for display at a display device.

To support reception and display of streamed game content, the client device 104 includes processing units such as a CPU and a GPU (not shown at FIG. 1). Each of these modules is analogous to the corresponding module of the server 102. Thus, for example, the CPU is generally configured to execute general-purpose instructions on behalf of the client device 104, such as executing one or more of an operating system, a web browser, and the like. It will be appreciated that, in some embodiments, the CPU and the GPU of the client device generally have relatively small compute power relative to the CPU 106 and the GPU 108 of the server 102. The game streaming system 100 thus leverages the computing power of the server 102 to stream game content to the client 104 that is of higher quality than can be generated by the client device 104 alone.

In operation, the client 104 initiates a game streaming session in response to a user requesting the game session via a computer program (not shown) executed at the client 104, such as via a web browser, a dedicated game streaming program, a video streaming service program, and the like. In response to the user request, the CPU 112 sends a game session request via the network 110 to the server 102. In response, the server 102 initiates execution of a game program 109. In some embodiments, the server 102 is configured to execute any one of a library of game programs, and the request provided by the client 104 indicates the particular one of the game programs to be executed.

During execution, the game program 109 maintains a collection of data, referred to as a game state, that represents the condition, or state, of the game. A user of the client 104 employs a game controller or other input device to provide input data to the CPU 112, which communicates the input data to the game program 109 via the network 110. In response to the input data, the game program 109 modifies the game state according to the rules of the particular game implemented by the game program 109.

Based on the game state, and according to the rules of the implemented game, the game program 109 employs the CPU 106 and the GPU 108 to generate rendered frames, representing visual game information such as a virtual environment, a game board, a selection screen, a heads-up display (HUD) and the like, or any combination thereof. The server 102 provides these rendered frames, designated streamed frames 115, to the network 110 for communication to the client 104. The client device 104 receives at least a subset of the streamed frames 115 and employs the GPU 108 to display the received frames at a display 117. The client device 104 thus displays the visual game information to the user who, in response, uses the game controller or other input device to provide further input data, resulting in further changes to the game state maintained by the game program 109 and corresponding changes to frames of the frame stream 115. In this way, the user of the client device 104 interacts with the game program 109 to play the game executed at the server 102.

To conserve network bandwidth and to ensure relatively rapid transmission of frames to the client device 104, the server 102 can encode each of the streamed frames 115 prior to transmission. Thus, in the example depicted in FIG. 1, the GPU 108 includes an encoder 121 that is generally configured to encode a raw frame 120 to generate an encoded frame 122 based on a specified video encoding format, such as H.262 (MPEG-2 Part 2), MPEG-4 Part 2, H.264 (MPEG-4 Part 10), or other video encoding format. The GPU 108 provides the encoded frame 122 to a network interface (not shown) that transmits the encoded frame 122 as part of the streamed frames 115. The client device 104 can include a decoder (not shown) to decode the encoded frames of the streamed frames prior to displaying the decoded frames to a user.

In some cases, the encoder process results in the encoded frame 122 having visible differences with the raw frame 120 (or visible differences when the encoded frame 122 is decoded and displayed). These differences are generally referred to as encoding artifacts, and can include such artifacts as color changes, pixilation, image blurring, and the like. Encoding artifacts can be visually distracting or otherwise negatively impact the user experience with the game streaming system 100. In some cases, the encoding artifacts can be reduced or eliminated by adjusting encoding parameters of the encoder 121, such as parameters associated with variance-based adaptive quantization (VBAQ). These parameter adjustments can be improved by identifying characteristics of the particular encoding artifacts present in the encoded frames. Accordingly, during development or execution of the game program 109, it is often useful to visually identify encoding artifacts in the encoded frames so that a developer or user can implement corresponding adjustments to the encoding parameters of the encoder 121. However, the encoding artifacts in a given encoded frame are may be small relative to the overall size of the encoded frame, and therefore difficult for the user or developer to identify visually. Accordingly, to assist the user or developer with identifying encoding artifacts, the GPU 108 includes an overlay generator 123 configured to generate an overlay 125 that provides a visible indicator of encoding artifacts for the encoded frame 122.

For example, in some embodiments the overlay generator 123 is configured to identify differences between features of the raw frame 120 and the encoded frame 122. As used herein, a feature of an image is one or more pixels of the image, and can be a single pixel, a set of pixels that correspond to a particular visual feature such as an edge, a corner, an object, and the like. A given feature, such as an individual pixel or a set of pixels, can have different characteristics between the raw frame 120 and the encoded frame 122, such as a difference in color, color pattern, level of pixilation, color variance in a set of pixels, and the like, or any combination thereof. The overlay generator 125 identifies the differences in characteristics for each feature and generates the overlay 125 to have a visual indicator of each identified feature and to indicate any encoding artifacts in the encoded frame 122.

In some embodiments, the overlay generator 123 identifies encoding artifacts using color subtraction. For example, the overlay generator 125 can subtract the color values of each pixel of the encoded frame 122 from the color values of corresponding pixels of the raw frame 120 (or vice-versa) to identify a color difference for each pixel, and generate the overlay 125 based on the identified color differences. In other embodiments, the overlay generator 123 identifies encoding artifacts by identifying a difference in the amount of blur between sets of pixels of the encoded frame 122 and corresponding sets of pixels of the raw frame 120. In some embodiments, the overlay generator 123 determines the amount of blur associated with a given set of pixels based on a variance in the value of the pixels in the set. The difference in the amount of blur between corresponding sets of pixels of the encoded frame 122 and the raw frame 120 is therefore based upon the difference in the variance of the corresponding sets of pixels.

In some embodiments, the size of the overlay 125 corresponds to the size of the encoded frame 122, and the GPU 108 positions the visual indicator for a feature so that the indicator is positioned at or near corresponding encoding artifact's location in one of the encoded frame 122, so that when the overlay and the encoded frame 122 are displayed together, the visual indicator visibly highlights the corresponding encoding artifact. In some embodiments, the GPU 108 selects the visual indicator for a feature based on one or more of the identified encoding artifacts for the feature. For example, in some embodiments the size, shape, or color, or a combination thereof, of the visual indicator indicates type, magnitude, or combination thereof, of the corresponding encoding artifact. Thus, for example, in some cases a particular color of visual indicator indicates an encoding artifact of one type, such as a difference in pixel color, while a different color of visual indicator indicates an encoding artifact of a different type, such as a difference in color or pixel variance.

In some embodiments, the GPU 108 composites the frame 122 and the overlay 125 into a single frame for display at a display device (not shown at FIG. 1). Accordingly, when the composite frame is displayed, the visual indicators of the overlay 125 visibly indicate encoding artifacts associated with the encoded frame 122, even when those discontinuities are themselves difficult or impossible to see with the naked eye. The developer of the game program 109 can adjust the encoding parameters of the encoder 121 to better address the identified encoding artifacts and improve the overall game experience at the client device 104.

Figure 2:
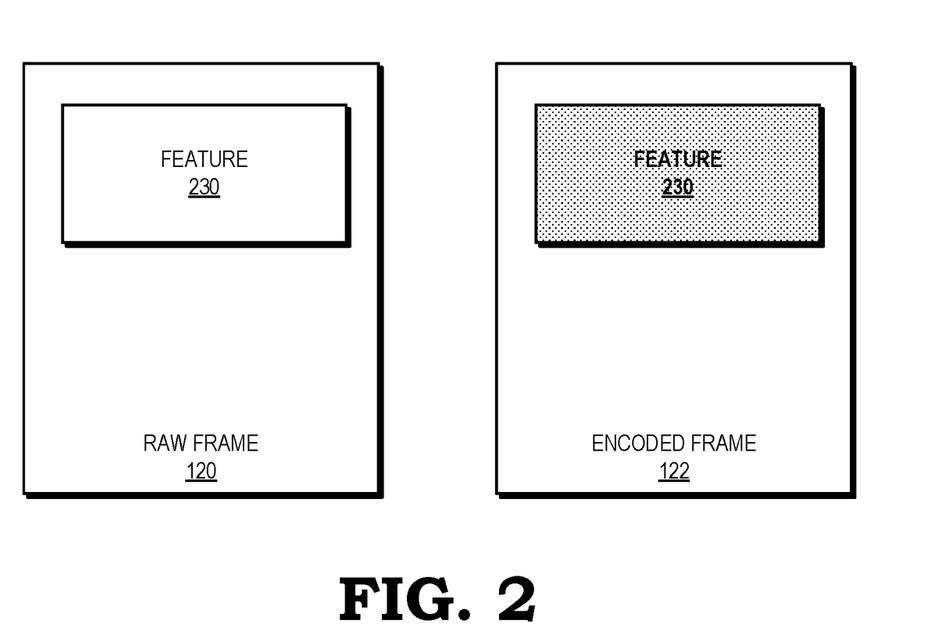
FIG. 2 is a diagram illustrating an example of an encoding artifact generated when encoding a raw frame at the game streaming system of FIG. 1 in accordance with some embodiments.

FIG. 2 illustrates an example of an encoding artifact associated with a feature 230 of the frames 120 and 122 in accordance with some embodiments. In the depicted example, the feature 230 is illustrated with no fill in raw frame 120 but has a crosshatched fill at the encoded frame 122, indicating that the feature 230 has an encoding artifact in the encoded frame 122. The feature 230 therefore can be any visual feature that can have an encoding artifact, such as an individual pixel, a set of pixels, a visual feature such as a corner of an object or an edge of an object, and the like.

Figure 3:
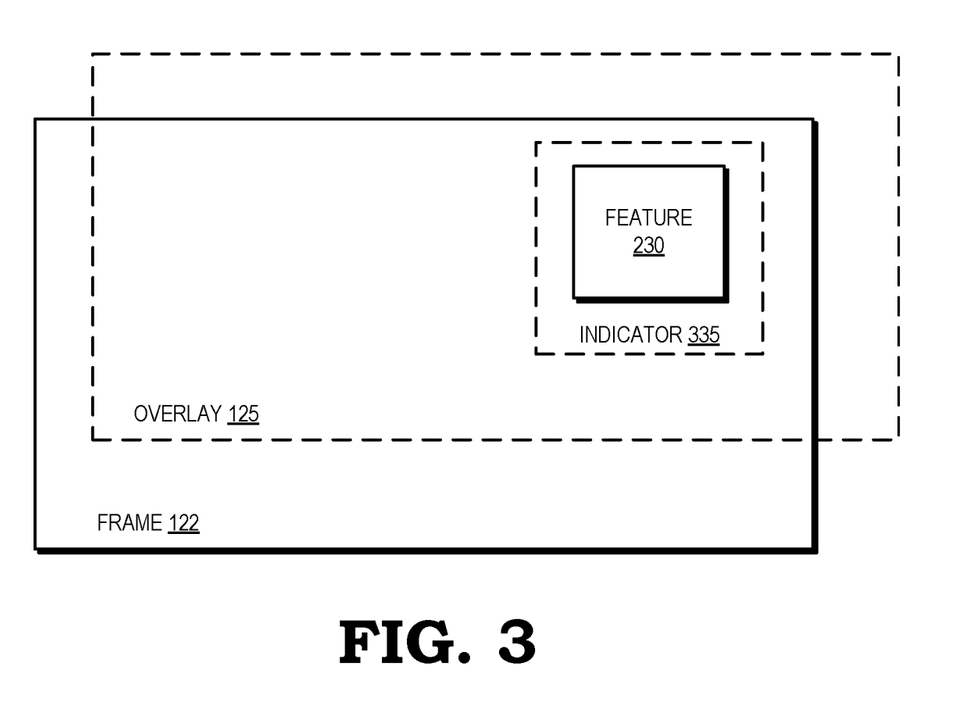
FIG. 3 is a diagram illustrating an example of the overlay of FIG. 1 in accordance with some embodiments.

FIG. 3 illustrates an example of the overlay 125 providing a visual indicator 335 for the feature 230 in accordance with some embodiments. In the depicted example, the overlay 125 is illustrated with a dashed outline, and is depicted as slightly offset from the frame 122 in order to differentiate the overlay from the frame. However, it will be appreciated that the GPU 116 can composite the overlay 125 with the frame 122 for display, so that the frame 122 and overlay 125 are effectively displayed together at the display 117. In particular, the indicator 335 is displayed over or near the feature 230 to provide a visual indicator of the associated discontinuity.

In different embodiments the indicator 335 is a color, shape, texture, informational text, icon, or other visual indicator, or combination thereof, that indicates one or more of the type of discontinuity associated with the feature 230, the magnitude of the discontinuity, a specified characteristic of the discontinuity (e.g., a spatial direction associated with a positional discontinuity), and the like, or any combination thereof. For example, in the case of a positional discontinuity, the indicator 335 can be a line or arrow indicating the size and direction of the positional discontinuity.

Figure 4:
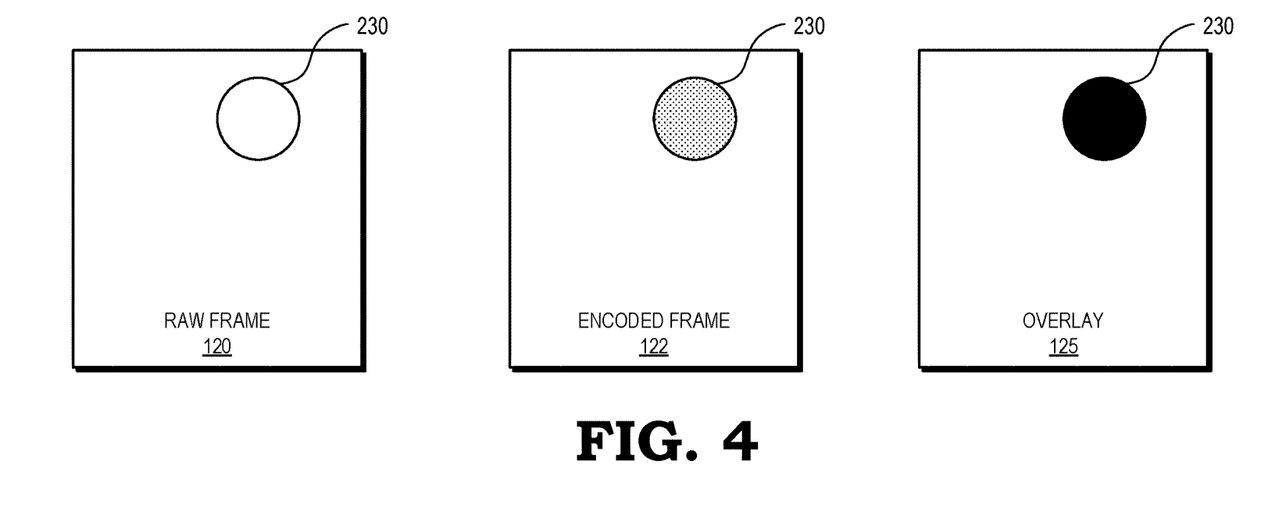
FIG. 4 is a diagram illustrating an example of the overlay of FIG. 1 identifying encoding artifact in a frame in accordance with some embodiments.

In some cases, multiple features of the encoded frame 122 are associated with encoding artifacts. For example, in some cases some features of the encoded frame 122 have color variance relative to the raw frame 120, while other features have variations in the amount of blur relative to the raw frame 120. In some embodiments, the GPU 116 generates the overlay 125 to include a visual indicator for each encoding artifact of the encoded frame 122. An example is illustrated at FIG. 4 in accordance with some embodiments. In the depicted example, the raw frame 120 includes multiple features, each feature illustrated by a corresponding circle with no fill. The encoded frame 122 includes encoding artifacts associated with each feature, illustrated by the circles having a gray fill. The overlay 125 includes visual indicators for each encoding artifact, illustrated by the circles with black fill.

The type of each visual indicator. Accordingly, each visual indicator can have different characteristics, such as a different size, color, shape, orientation, textual information, icon, and the like, or a combination thereof, that visually indicate the type of encoding artifact associated with the corresponding feature. For example, in some embodiments, the one visual indicator is of a red color, to indicate that the feature is associated with a color variance artifact, while another visual indicator has a blue color to indicate that the corresponding feature 440.

In some embodiments, the type of visual indicator, or a characteristic thereof, such as the size, color, or shape of the visual indicator, indicates a magnitude of the associated encoding artifact. For example, in some embodiments, a visual indicator of one color indicates one level of variance between the encoded frame 122 and the raw frame 120, and a visual indicator of a different color indicates a different level of variance between the encoded frame 122 and the raw frame 120. Thus, in the example of FIG. 4, the overlay 125 includes visual indicators for multiple encoding artifact, where each visual indicator can indicate a type, magnitude, and other characteristics of the associated encoding artifact.

In some embodiments, the overlay generator 123 generates visual indicators for a given encoding artifact only when the frame difference associated with that encoding artifact exceeds a threshold. For example, the overlay generator 123 can identify an encoding artifact based on a pixel value difference between a pixel of the encoded frame 122 and the raw frame 120. In response to the pixel value difference exceeding a threshold, the overlay generator 123 generates a visual indicator for the encoding artifact to display via the overlay 125. In response to the pixel value difference being below the threshold, the overlay generator 123 omits a visual indicator for the encoding artifact from the overlay 125. The overlay generator 123 thereby omits visual identifiers for encoding artifacts that are less likely to be visible, allowing the developer to focus on more visible encoding artifacts. In some embodiments, the overlay generator 123 can change the magnitude of the threshold in response to specified events, such as frames being associated with a scene change of the game program 109.

In some embodiments, the color, luminance, or intensity of a visual indicator is based on the magnitude of the difference associated with the corresponding encoding artifact. For example, in some embodiments the overlay generator 123 generates the overlay 125 as a heat map, wherein an intensity of each pixel of a visual indicator corresponds to a magnitude of the difference associated with the corresponding encoding artifact.

In some embodiments, the overlay generator 123 generates a visual indicator to have a color or other characteristic based on a color or other characteristic of the corresponding portion of the encoded frame 122. For example, the overlay generator 123 can generate a visual indicator by inverting the pixel values of one or more of the pixels of the encoded frame corresponding to the encoding artifact. In some embodiments, the overlay generator 123 inverts all pixels within a specified pixel radius of a pixel corresponding to the encoding artifact. In still other embodiments, a visual indicator can include textual information identifying characteristics of the associated encoding artifact.

Figure 5:
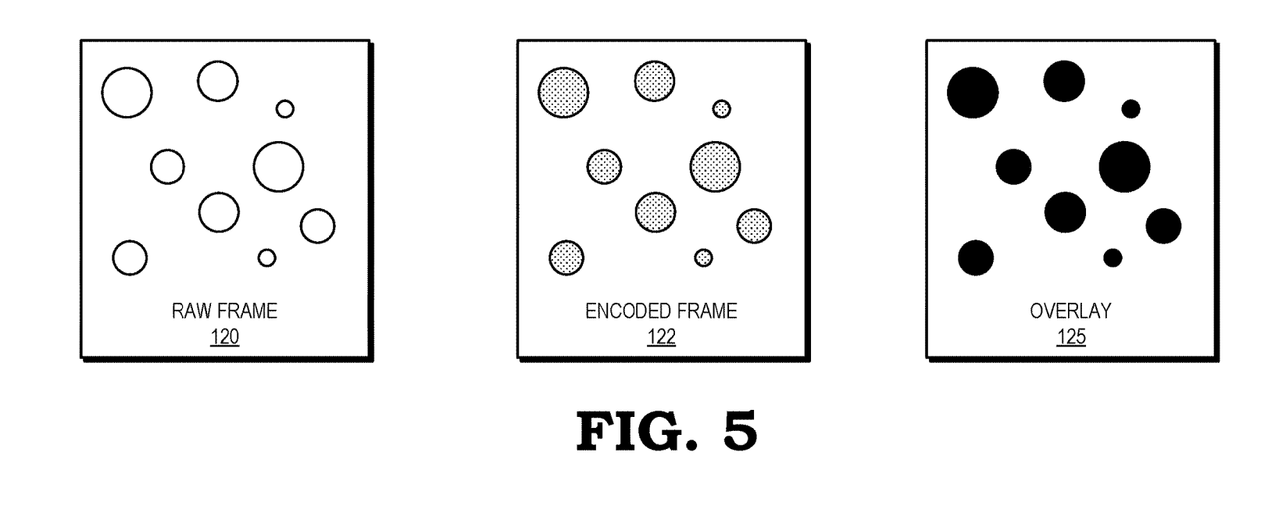
FIG. 5 is a diagram illustrating an example of the overlay of FIG. 1 identifying multiple encoding artifacts in an encoded frame in accordance with some embodiments.

FIG. 5 is a block diagram of the overlay generator 123 in accordance with some embodiments. The overlay generator 123 can be, in different embodiments, a software modules executed at one or more of the CPU 106 and the GPU 108 of the server 102. In other embodiments, one or more aspects of the overlay generator 123 is implemented by dedicated hardware of the server 102.

In the depicted example, the overlay generator 123 includes a color subtraction module 652 and a blur detection module 654. The color subtraction module 652 is configured to perform a color subtraction process based on the raw frame 120 and the encoded frame 122. For example, in some embodiments the color subtraction module 652 subtracts the pixel color value of each pixel of the raw frame 120 from the pixel color value of the corresponding pixel of the encoded frame Based on the color difference for a given pixel, the color subtraction module 652 assigns a color value to the corresponding pixel of the overlay 125. For example, in some embodiments, if the difference associated with a pixel is within a first range, the color subtraction module 652 assigns a first color to the corresponding pixel of the overlay 125, and if the difference associated with the pixel is within a second, different range, the color subtraction module 652 assigns a second, different color to the corresponding pixel of the overlay 125. The colors of the overlay 125 thereby denote the color difference between the raw frame 120 and the encoded frame 122 for each pixel.

The blur detection module 654 is configured to determine, for designated sections of pixel, a difference in a level of blur between the raw frame 120 and the encoded frame 122. To illustrate, in some embodiments the blur detection module 654 applies a window of a specified size (in number of pixels) and shape to the raw frame 120 and the encoded frame 122, determines the difference in the level of blur for the applied window, then shifts the window to another set of pixels. For example, in some embodiments the blur detection module 654 uses an N×N window, where N is an integer number of pixels. In some embodiments, the blur detection module 654 determines a level of blur for the window by determining a pixel variance for the window, such as a difference between the brightest and darkest pixel in the window. To determine the difference in the level of blur, the blur detection module 654 determines the level of blur for a window by determining a power spectrum of pixel values of the window, with the level of blur indicated by the spatial frequency of the power spectrum.

Based on the blur difference for a given window, the color subtraction module 652 assigns a color value to the corresponding pixels of the overlay 125. For example, in some embodiments, if the blur difference associated with a window is within a first range, the color subtraction module 652 assigns a first color to the corresponding pixels of the overlay 125, and if the blur difference associated with the pixel is within a second, different range, the color subtraction module 652 assigns a second, different color to the corresponding pixel of the overlay 125. As with the color subtraction process, the colors of the overlay 125 thereby denote the blur difference between the raw frame 120 and the encoded frame 122 for each window.

Figure 6:
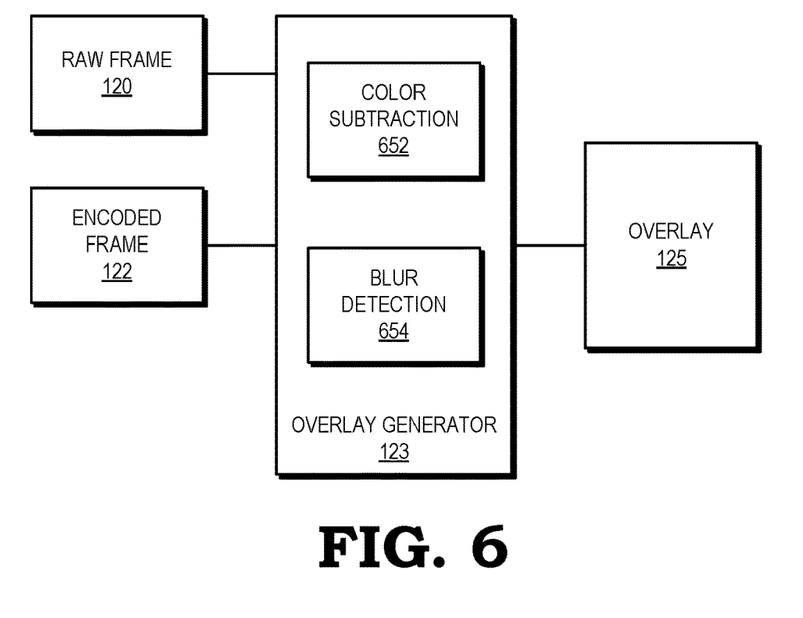
FIG. 6 is a block diagram illustrating an overlay generator that generates the overlay of FIG. 1 in accordance with some embodiments.
Figure 7:
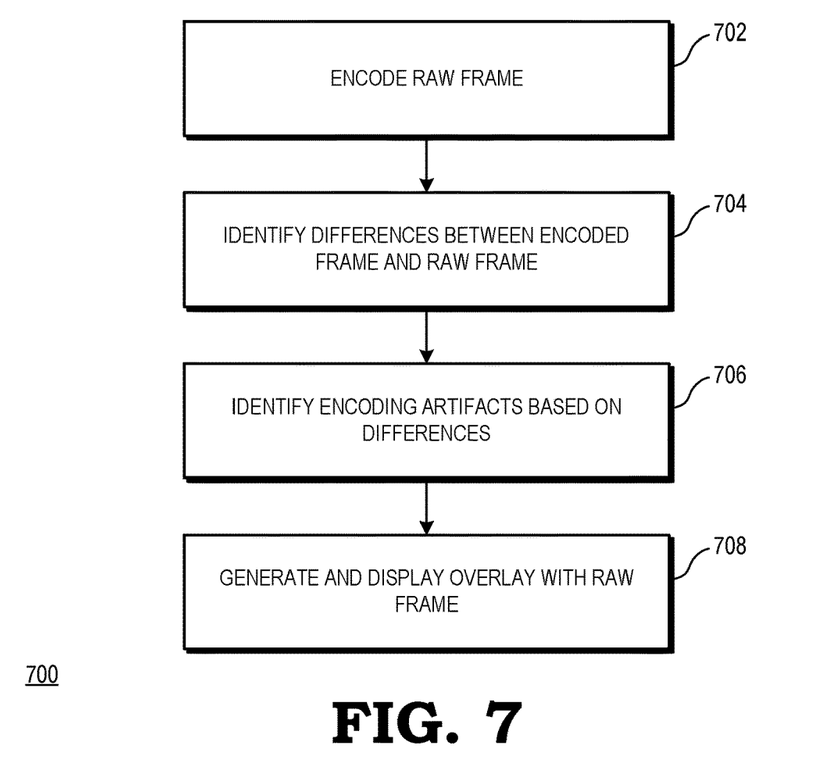
FIG. 7 is a flow diagram illustrating a method of generating an overlay that identifies encoding artifacts in encoded frames of a game stream in accordance with some embodiments.

FIG. 6 illustrates a flow diagram of a method 700 of generating an overlay with visual indicators showing encoding artifacts for frames of a game stream in accordance with some embodiments. For purposes of description, the method 700 is described with respect to an example implementation at the game streaming system 100 of FIG. 1. At block 702, encoder 121 encodes the raw frame 120 to generate the encoded frame 122. At block 704, the overlay generator 123 identifies differences between the encoded frame 122 and the raw frame 120, such as color differences, differences in blur level, and the like. At block 706, the overlay generator 123 identifies encoding artifacts based on the differences identified at block 704. At block 706, the overlay generator 123 generates the overlay 125 to include visual indicators of the encoding artifacts identified at block 704. At block 708, the GPU 108 composites the overlay 125 with the encoded frame 122 and sends the composited frame to a display device for display, thereby allowing a user to quickly and visually identify encoding artifacts in the encoded frame, and to make adjustments in the encoding parameters for the encoder 121.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    encoding a raw frame to generate an encoded frame for a video stream comprising a plurality of frames for display;
    identifying a first encoding artifact based on a first difference between the encoded frame and the raw frame; and
    applying an overlay to the encoded frame, the overlay including a first visual indicator indicating the first encoding artifact.

2. The method of claim 1, wherein the first difference comprises a difference in at least one characteristic of one or more pixels between the encoded frame and the raw frame.

3. The method of claim 2, wherein the first difference comprises a color difference between the encoded frame and the raw frame.

4. The method of claim 2, wherein the first difference comprises a texture difference between the encoded frame and the raw frame.

5. The method of claim 2, wherein the first difference comprises a blur difference between the encoded frame and the raw frame.

6. The method of claim 5, wherein identifying the first difference comprises identifying a difference in pixel variance for at least a portion of the encoded frame and a corresponding portion of the raw frame.

7. The method of claim 1, further comprising:
    including the first visual indicator with the overlay in response to the first difference exceeding a threshold.

8. The method of claim 1, wherein the first visual indicator is based on a magnitude and/or type of the first difference.

9. The method of claim 8, further comprising:
    determining the type of the first difference out of at least two different types of differences for the first encoding artifact.

10. The method of claim 1, wherein the first visual indicator comprises a color.

11. The method of claim 1, wherein the first visual indicator comprises a texture.

12. The method of claim 1, further comprising:
    identifying a second encoding artifact based on a second difference between the encoded frame and the raw frame; and
    wherein the overlay includes a second visual indicator indicating the second encoding artifact, the second visual indicator different from the first visual indicator.

13. The method of claim 12, wherein the first and second visual indicators differ in at least one of a size, a shape and color.

14. The method of claim 1, further comprising positioning the first visual indicator at or over at least a part of or the complete first encoding artifact.

15. The method of claim 1, further comprising the use of an overlay generator of a server providing the video stream, the overlay generator being configured to generate the overlay for providing the first visual indicator.

16. The method of claim 1, further comprising:
    adjusting at least one encoding parameter for encoding the raw frame based on the first visual indicator.

17. The method of claim 16, wherein at least two different encoding parameters are used for encoding the raw frame and are adjustable based on the first visual indicator.

18. The method of any claim 1, further comprising:
    displaying the encoded frame for provision via a video stream with the overlay.

19. A method, comprising:
    identifying an encoding artifact based on a difference between a pixel of an encoded frame and a corresponding pixel of a raw frame, the encoded frame for provision via a video stream;
    applying an overlay to the encoded frame, the overlay indicating the encoding artifact; and
    displaying the encoded frame with the overlay.

20. The method of claim 19, wherein the encoding artifact comprises at least one of a color difference, a texture difference and a blur difference.

21. A non-transitory computer readable medium embodying a set of executable instructions, the set of executable instructions to manipulate at least one processor to:
    encode a raw frame to generate an encoded frame for a video stream comprising a plurality of frames for display;
    identify a first encoding artifact based on a first difference between the encoded frame and the raw frame; and
    apply an overlay to the encoded frame, the overlay including a first visual indicator indicating the first encoding artifact.

22. The computer readable medium of claim 21, wherein the first difference comprises a difference in at least one characteristic of one or more pixels between the encoded frame and the raw frame.

23. The computer readable medium of claim 21, wherein the first difference comprises a color difference between the encoded frame and the raw frame.

24. The computer readable medium of claim 21, wherein the first difference comprises a texture difference between the encoded frame and the raw frame.

25. The computer readable medium of any one of claim 21, wherein the first difference comprises a blur difference between the encoded frame and the raw frame.

26. The computer readable medium of claim 25, wherein identifying the first difference comprises identifying a difference in pixel variance for at least a portion of the encoded frame and a corresponding portion of the raw frame.

27. The computer readable medium of claim 21, wherein the executable instructions manipulate the processor to:
    include the first visual indicator with the overlay in response to the first difference exceeding a threshold.

28. The computer readable medium of claim 21, wherein the first visual indicator is based on a magnitude of the first difference.

29. The computer readable medium of claim 21, wherein the first visual indicator comprises a color.

30. The computer readable medium of claim 29, wherein the first visual indicator comprises a texture.

31. The computer readable medium of claim 21, wherein the executable instructions manipulate the processor to:
- identify a second encoding artifact based on a second difference between the encoded frame and the raw frame; and
- wherein the overlay includes a second visual indicator indicating the second encoding artifact, the second visual indicator different from the first visual indicator.

32. A real-time video streaming system comprising a server for generating encoded frames for transmission to at least one client device based on a game state of a video game program executed at the server, the server being configured to:
- encode a raw frame to generate an encoded frame for a video stream comprising a plurality of frames for display;
- identify a first encoding artifact based on a first difference between the encoded frame and the raw frame; and
- apply an overlay to the encoded frame, the overlay including a first visual indicator indicating the first encoding artifact.

* * * * *

UNITED STATES PATENT AND TRADEMARK OFFICE
CERTIFICATE OF CORRECTION

| | | |
|---|---|---|
| PATENT NO. | : 12,088,854 B2 | Page 1 of 1 |
| APPLICATION NO. | : 17/435883 | |
| DATED | : September 10, 2024 | |
| INVENTOR(S) | : Erik F. Nelson et al. | |

It is certified that error appears in the above-identified patent and that said Letters Patent is hereby corrected as shown below:

In the Claims

At Column 12 Line 17, please correct "The method of any claim 1" to be --The method of claim 1--

At Column 12 Line 52, please correct "of any one of claim 21" to be --of claim 21--

Signed and Sealed this
Eighth Day of July, 2025

Coke Morgan Stewart
*Acting Director of the United States Patent and Trademark Office*